(12) United States Patent
De Paiva

(10) Patent No.: US 6,488,342 B1
(45) Date of Patent: Dec. 3, 2002

(54) HUB CAP FOR A WHEEL BEARING

(75) Inventor: Karl A De Paiva, Currumbin Waters (AU)

(73) Assignee: Neumann Steel Pty. Ltd., Queensland (AU)

( * ) Notice: Subject to any disclaimer, the term of this patent is extended or adjusted under 35 U.S.C. 154(b) by 0 days.

(21) Appl. No.: 09/889,201

(22) PCT Filed: Aug. 4, 2000

(86) PCT No.: PCT/AU00/00935
§ 371 (c)(1),
(2), (4) Date: Jul. 13, 2001

(87) PCT Pub. No.: WO01/10655
PCT Pub. Date: Feb. 15, 2001

(30) Foreign Application Priority Data

Aug. 6, 1999 (AU) .............................................. PQ2085

(51) Int. Cl.[7] .................................................. B60B 7/00
(52) U.S. Cl. .................................. 301/108.1; 301/108.4
(58) Field of Search ........................... 301/108.1, 108.2, 301/108.3, 108.4; 384/471

(56) References Cited

U.S. PATENT DOCUMENTS

| | | | | |
|---|---|---|---|---|
| 353,709 | A | * 12/1886 | Rapp | 301/108.2 |
| 715,367 | A | * 12/1902 | Giles | 301/108.2 |
| 3,089,738 | A | * 5/1963 | Steiner | 301/108.2 |
| 3,114,579 | A | 12/1963 | Isenbarger | |
| 3,177,041 | A | * 4/1965 | Isenbarger | 301/108.2 |
| 3,316,022 | A | * 4/1967 | Isenbarger | 301/108.2 |
| 3,893,690 | A | * 7/1975 | Yapp | 301/108 |
| 4,067,621 | A | * 1/1978 | Reppert | 301/108.3 |
| 4,073,540 | A | * 2/1978 | Jackowski | 156/216 |
| 5,066,071 | A | * 11/1991 | Kinser | 210/222 |
| 5,303,800 | A | * 4/1994 | Persson | 184/45.1 |
| 5,505,525 | A | * 4/1996 | Denton | 301/108.2 |

FOREIGN PATENT DOCUMENTS

| | | | |
|---|---|---|---|
| AU | 52007/93 | | 6/1994 |
| AU | 52007/93 A | * | 11/1995 |
| EP | 490 831 | | 6/1992 |
| EP | 0490831 A1 | * | 6/1992 |

* cited by examiner

Primary Examiner—S. Joseph Morano
Assistant Examiner—Frantz F. Jules
(74) Attorney, Agent, or Firm—Nixon & Vanderhye P.C.

(57) ABSTRACT

A hub cap (10) is fitted to the outer end of a wheel hub (11) containing a wheel bearing (14) to seal the outer end of the hub (11). The hub cap (10) has a cylindrical housing (16) which is provided with a transparent outer end wall (17) to permit the level of lubrication around the bearing (14) to be ascertained visually. The cylindrical housing (16) has an aperture within which a plug (22) is fitted. The plug (22) has a flexible diaphragm (21) which deforms to accommodate pressure changes within the hub cap (10). The hub cap (10) is particularly suitable for wheel bearings of trailers, such as boat trailers.

10 Claims, 2 Drawing Sheets

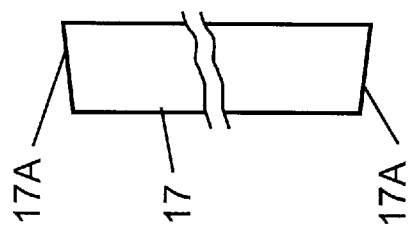
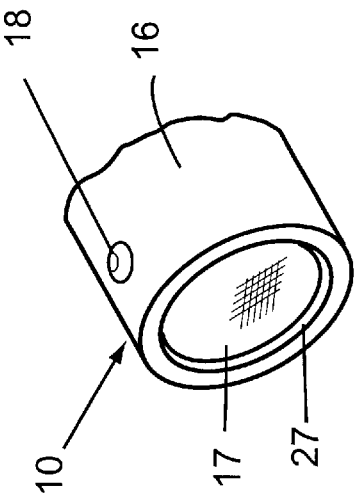
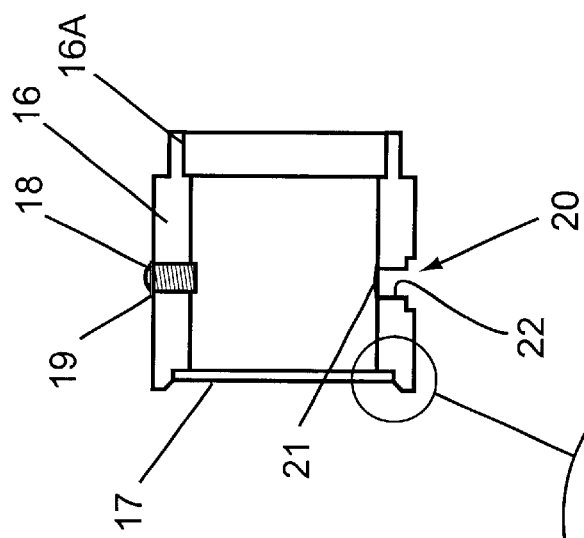
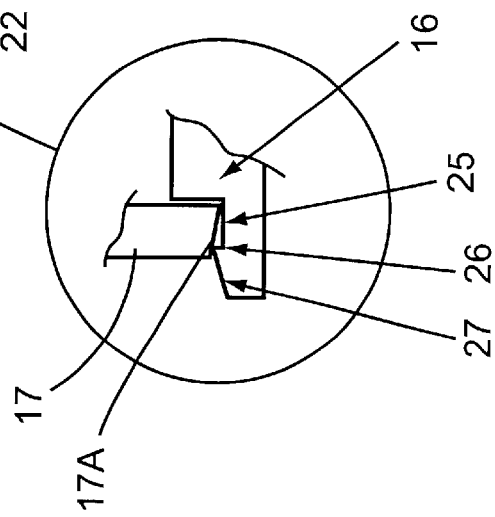

HUB CAP FOR A WHEEL BEARING

This invention relates to a hub cap assembly for a wheel bearing. The invention is particularly, but not solely, directed to a hub cap for a wheel bearing on a boat trailer.

BACKGROUND ART

Hub caps are normally placed on wheel bearings to prevent ingress of dirt, dust, water and other contaminants to the bearing, and thereby prolong the life of the wheel bearing. The hub cap also serves to retain lubricating grease in the bearing cavity.

Wheel bearing assemblies on trailers are lubricated by hand packing grease into the bearings at the time of assembly. Thereafter, wheel bearings, particularly those on trailers, are seldom checked (especially as trailers do not normally undergo regular servicing). Hence, the loss of lubricating grease from the wheel bearing may go unnoticed until the bearing fails. (With loss of lubrication, the bearing runs extremely hot, particularly at highway speeds. The bearing materials are likely to fail at high temperatures, with possibly catastrophic results if the vehicle is travelling at high speed).

In most wheel assemblies, there is little, if any, provision for the permanent lubrication of the inboard or rear seal of the bearing. Consequently, many rear seals will dry up and/or burn out in a short period of time in the absence of lubrication, thereby creating opportunity for water to enter the bearing.

It is known to use sealed hub caps on wheel bearings to prevent loss of lubrication. However, the interior of a wheel bearing is subject to a wide range of temperatures. From ambient temperature when stationary, the temperature inside the wheel bearing can increase quite quickly to over 90° C. when the vehicle is travelling at highway speeds. With such increase in temperature, the resultant pressure increase within the sealed bearing can cause the inboard grease seal to blow out, resulting in loss of lubrication.

Vented hub caps are sometimes used to accommodate temperature increases in the bearing chamber. By venting the hub cap to the atmosphere, the pressure within the bearing chamber is maintained at or near atmospheric pressure.

Although vented hub caps are able to handle pressure changes due to variations in the temperature of the bearing, they give rise to particular problems when subjected to rapid temperature changes. For example, wheel bearings on boat trailers are usually at an elevated temperature after a road trip to a boat launching ramp. When the hot wheel bearings are submerged in the water during the boat launching procedure, the temperature of the bearing chamber is reduced rapidly, leading to a sudden pressure drop or partial vacuum in the bearing chamber. As a result, water and other contaminants are sucked in through the hub cap vents and/or the inboard seal.

Due to the substantially closed configuration of the bearing chamber, such water can remain in the bearing for a considerable period of time. This leads to rust, particular if the bearing is unused for extended periods as is common for boat trailers. The rust problem is exacerbated if the water is salt water.

It is an object of the present invention to provide an improved hub cap for a wheel bearing which overcomes or ameliorates at least some of the above described disadvantages, or which at least provides the consumer with a useful choice.

SUMMARY OF THE INVENTION

The invention provides a hub cap for a wheel bearing. The hub cap is in the form of a cup-like housing adapted to be fitted to a wheel hub containing the bearing. The cup-like housing preferably has at least one transparent portion to enable the level of lubrication in the housing to be ascertained visually.

Typically, the cup-like housing is of cylindrical form, and the transparent portion is a circular glass end wall sealingly fitted to the cylindrical housing.

Advantageously, the hub cap is a sealed or closed hub cap, rather than a vented hub cap. The closed construction of the hub cap prevents ingress of contaminants to the wheel housing.

More preferably, the hub cap includes at least one flexible portion adapted to accommodate pressure changes within the hub cap housing.

In the preferred embodiment, the hub cap includes a pressure equalisation device having a membrane sealingly located in an aperture in the cup-like housing. The inner side of the membrane is subject to pressure within the housing, while the outer side of the membrane is vented to the atmosphere. The flexible membrane can deform to substantially equalise the pressure within the hub cap housing with the outside pressure, while maintaining the sealed nature of the hub cap.

A filler plug or similar device is suitable provided on the housing to allow lubricating material to be fed to the wheel bearing via the hub cap.

Preferably the lubricating material is oil. The oil not only serves to lubricate the bearings, but also protects the rear seal from drying out. Since the rear seal is permanently lubricated by the oil, it remains waterproof. As the front hub cap is also waterproof, the complete wheel bearing is sealed, and suitable for marine applications.

The hub cap is particularly suitable for trailers, such as boat trailers.

In order that the invention may be more fully understood and put into practice, a preferred embodiment thereof will now be described with reference to the accompanying drawings.

BRIEF DESCRIPTION OF THE DRAWINGS

FIG. 2 is a sectional side elevation of the hub cap of FIG. 1 (with cross hatching omitted).

FIG. 3 is a side elevation of the glass end wall of the hub cap of FIG. 1; and

FIG. 4 is a fragmentary perspective view of the hub cap of FIG. 1.

DESCRIPTION OF PREFERRED EMBODIMENT

Figure 1:
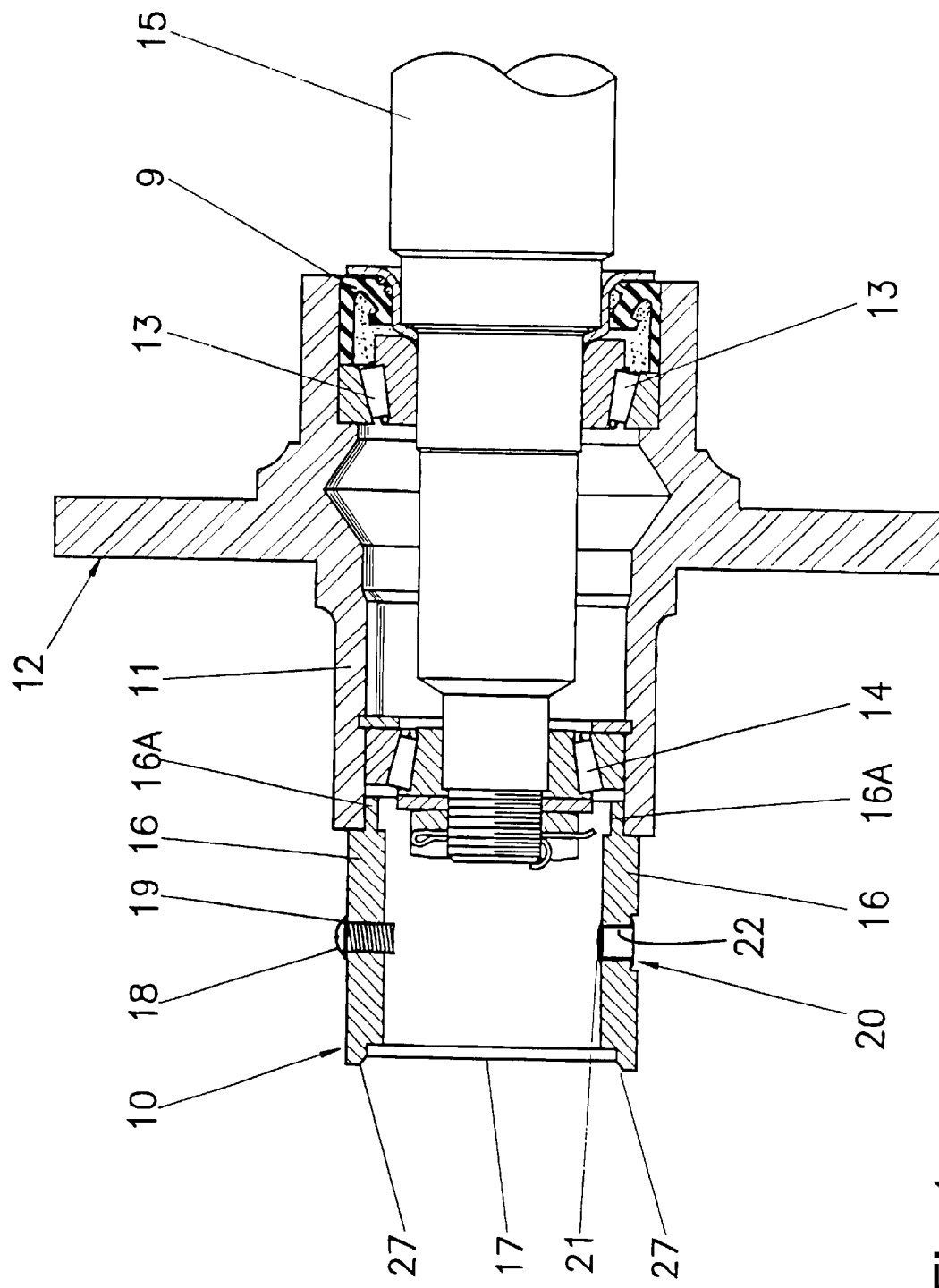
FIG. 1 is a sectional side elevation of a hub cap according to one embodiment of the invention, applied to a wheel bearing.

As shown in FIG. 1, a hub cap 10 is fitted to a hub portion 11 of wheel 12, which may be a trailer wheel. Inner and outer wheel bearings 13, 4 are housed in the wheel hub 11, and are mounted on a shaft 15. A rear or inboard seal 9 is mounted on the shaft 15 inward of the inner bearing 13. The construction of such wheel hubs and bearing arrangements is well known in the art, and need not be described in detail in this application.

The hub cap 10 is generally of cup-like configuration, and comprises a cylindrical (tubular) body or shell, hereafter referred to as the cap housing 16. The housing 16 is typically made of metal but can be made of any other suitable material. The hub cap 10 is typically fitted to the wheel hub 11 in an interference fit, but may be screwed to the hub or fitted in any other appropriate manner.

If the hub cap is used on a boat trailer, a person may stand on the hub cap in order to reach into a boat carried on the trailer. To ensure that the hub cap, when fitted, can support the weight of a person, the hub cap 10 is preferably fitted to the wheel hub 11 in a tight interference fit. This can be achieved by ensuring that the outer diameter of the inner flange 16A of the housing 16 is approximately 0.08 mm to 0.12 mm larger than the inner diameter of the opening in the wheel hub in which the hub cap is inserted. The inner flange 16A extends approximately 7 mm into the wheel hub. The hub cap can be hammered into the wheel hub. The housing 16 is selected to be of suitable thickness and strength such that when the housing is fitted to the wheel hub in the interference fit as described above, a person is able to stand on the hub cap without dislodging it from the wheel hub.

The cap housing 16 has an outer end wall 17, at least part of which is transparent. Preferably the end wall 17 is a circular glass window portion sealingly fitted to the outer end of the cap housing 16. The window 17 allows the level of lubricating grease or oil within the bearing to be quickly ascertained by visual inspection. Thus, the bearing lubrication can be checked without the need for removal of the hub cap 10 itself.

The window 17 is fitted to the housing 16 in a self-sealing fit, thereby obviating the need for an O-ring or other added seal component.

As shown in FIG. 2, an annular channel 25 is provided around the inside of the housing 16, spaced inwardly from the outer end of the housing. This channel is of narrower width than the width of the glass end wall 17. (Typically the channel is approximately 2 mm wide, and the glass wall is approximately 3 mm thick). An inwardly directed annular ridge 26 is formed at the outer end of the channel 25 by the junction of the outer radial wall of the channel and a tapered shoulder 27, as shown in the enlarged portion of FIG. 2.

The glass end wall 17 is preferably provided with tapered edges, as shown in the side view of FIG. 3. Typically, the edges 17A of the glass end wall 17 are provided with a 5° bevel. When the glass end wall 17 is press fitted to the housing 16, the wider side of the end wall 17 is pushed through the annular shoulder portion 27 of the housing 16 and locates in the channel 25. The inwardly directed ridge 26 "bites" into the circumferential surface of the end wall 17 not only to retain the end wall in position in the housing 16, but also to form a mechanical seal between the housing 16 and the glass end wall 17.

The shoulder portion 27 which protrudes outwardly beyond the glass end wall 17 serves as a protective lip which helps shield the glass end wall against stone chips or other material encountered while travelling.

The material of the transparent end wall 17 is preferably UV stabilised or otherwise resistant to degradation by ultra violet radiation.

A filler plug 18 is suitable provided in the cap housing 16, as shown in the drawings. The filler plug 18 may be screwed into a threaded bore through the cap housing 16, or fitted to the cap housing in any other suitable manner. A sealing ring 19 may also be provided to ensure proper sealing of the filler plug 18. If visual inspection of the hub cap window 17 reveals a low level of lubrication within the bearing, the filler plug 18 can be quickly and easily removed to permit additional oil or other liquid lubrication to be added to the bearing.

Preferably, the lubrication is oil. The use of lubricating oil fluid within the wheel bearing has several advantages. First, it provides greater lubrication to the actual bearings, thereby increasing the weight bearing capacity of the bearings. Secondly, the oil fluid is able to reach and lubricate the rear seal 9, thereby keeping it waterproof and functional.

The hub cap 10 is a closed or sealed hub cap which maximises protection against ingress of contaminants such as dust and water. Yet, the hub cap 10 accommodates pressure changes due to varying temperatures within the wheel bearing. As shown in the drawings, the hub cap 10 includes a pressure equalisation device 20 which is designed to accommodate pressure changes within the hub cap, and maintain the internal pressure at around atmospheric pressure.

The pressure equaliser 20 consists of a plug 22 having a flexible diaphragm-like portion 21. The plug is sealingly fitted in an aperture in the cap housing 16 as shown in FIG. 2. The plug is made of rubber or other elastomeric material.

The outer side of the diaphragm 21 is vented to the atmosphere, but the inner side of the diaphragm 21 is subject to the pressure within the wheel bearing.

In use, the diaphragm 21 will deform outwardly to accommodate pressure increases within the cap housing 16 due to higher operating temperatures of the wheel bearing. If the temperature suddenly decreases, for example by submerging the wheel bearing in water, the diaphragm 21 can quickly deform inwardly in response to such pressure changes, while the sealed nature of the hub cap 10 is maintained. Hence, the wheel bearing is kept free of contaminants, and its life is prolonged.

The foregoing describes only one embodiment of the invention and modifications which are obvious to those skilled in the art may be made thereto without departing from the scope of the invention. For example, although the hub cap 10 is particularly suitable for wheel bearings on trailers, it may also be used on wheel bearings of self-powered vehicles.

What is claimed is:

1. A non-vented hub cap for a wheel bearing, the hub cap comprising a cup-like housing adapted to be fitted to an outer end of a wheel hub containing the bearing so as to hermetically seal the outer end of the wheel hub and retain a liquid lubricant in the wheel hub around the bearing, the cup-like housing including a hollow cylindrical portion having an open inner end adapted to be sealingly fitted to the wheel hub and an end wall at its outer end, the end wall having a transparent portion permitting the level of liquid lubrication within the housing to be ascertained visually without removing the hub cap from the wheel hub, and a plug sealingly fitted in an aperture in the housing, the plug having a flexible membrane of elastomeric material adapted to deform in response to pressure changes within the hub cap.

2. A hub cap as claimed in claim 1, wherein the end wall is a glass end wall sealingly fitted to the cylindrical portion.

3. A hub cap as claimed in claim 2, wherein the cylindrical portion has an annular groove at its outer end, and an annular ridge adjacent the annular groove, the annular groove being adapted to receive a peripheral edge portion of the glass end wall but having a width less than the thickness of the glass end wall such that the annular ridge mechanically engages a circumferential surface of the peripheral edge portion.

4. A hub cap as claimed in claim 2, wherein the housing includes a closable lubrication port.

5. A wheel hub having a wheel bearing therein, lubricating oil contained in the wheel hub in fluid communication with the bearing, and a non-vented hub cap mounted to an outer end of the wheel hub so as to hermetically seal the outer end of the wheel hub and retain the lubricating oil in the wheel hub, the hub cap comprising a cup-like housing including a hollow cylindrical portion having an open inner end sealingly fitted to the wheel hub and an end wall at its outer end, the end wall having a transparent portion to enable the level of oil in the housing to be ascertained visually without removing the hub cap, and a plug sealingly fitted in an aperture in the housing, the plug having a flexible membrane of elastomeric material adapted to deform in response to pressure changes within the hub cap.

6. A wheel hub as claimed in claim 5, wherein the end wall is a glass end wall sealingly fitted to the cylindrical housing.

7. A wheel hub as claimed in claim 6, wherein the cylindrical portion has an annular groove at its outer end, and an annular ridge adjacent the annular groove, the annular groove being adapted to receive a peripheral edge portion of the glass end wall but having a width less than the thickness of the glass end wall such that the annular ridge mechanically engages a circumferential surface of the peripheral edge portion.

8. A wheel hub as claimed in claim 6, wherein the cup-like housing has a closable lubrication port for introducing the lubricating oil into the hub cap.

9. A wheel hub as claimed in claim 6, further comprising a rear seal mounted to the inner end of the wheel hub.

10. A wheel hub as claimed in claim 5, wherein the hub cap is mounted to the wheel hub in an interference fit.

* * * * *